US009121175B2

(12) United States Patent
Fushiki

(10) Patent No.: US 9,121,175 B2
(45) Date of Patent: Sep. 1, 2015

(54) SOUNDPROOF BODY AND INSULATOR FOR MOTOR VEHICLES

(71) Applicant: HOWA TEXTILE INDUSTRY CO., LTD., Kasugai-shi, Aichi (JP)

(72) Inventor: Shinobu Fushiki, Kasugai (JP)

(73) Assignee: HOWA TEXTILE INDUSTRY CO., LTD., Katsugai-Shi (JP)

( * ) Notice: Subject to any disclaimer, the term of this patent is extended or adjusted under 35 U.S.C. 154(b) by 4 days.

(21) Appl. No.: 14/237,428

(22) PCT Filed: Jul. 8, 2013

(86) PCT No.: PCT/JP2013/068633
§ 371 (c)(1),
(2) Date: Feb. 6, 2014

(87) PCT Pub. No.: WO2014/010551
PCT Pub. Date: Jan. 16, 2014

(65) Prior Publication Data
US 2014/0246268 A1     Sep. 4, 2014

(30) Foreign Application Priority Data

Jul. 12, 2012   (JP) ................. 2012-156664

(51) Int. Cl.
*E04B 1/82*     (2006.01)
*F02B 77/13*     (2006.01)
(Continued)

(52) U.S. Cl.
CPC ................ *E04B 1/8218* (2013.01); *B32B 5/18* (2013.01); *B60R 13/083* (2013.01); *G10K 11/168* (2013.01)

(58) Field of Classification Search
CPC .. B60R 13/08; B60R 13/0815; B60R 13/083; G10K 11/16; G10K 11/168; G10K 11/162; E04B 1/82; E04B 1/8209; E04B 1/8218; E04B 1/84; E04B 1/8409; F02B 77/11; F02B 77/13
USPC ................. 181/290, 291, 292, 288, 204, 205; 296/39.3, 39.1, 181.6, 211
See application file for complete search history.

(56) References Cited

U.S. PATENT DOCUMENTS 3,881,569 A * 5/1975 Evans, Jr. ........................ 181/200
4,076,100 A * 2/1978 Davis ............................. 181/290
(Continued)

FOREIGN PATENT DOCUMENTS

JP    A 7-81007     3/1995
JP    A 2001-65077     3/2001
(Continued)

OTHER PUBLICATIONS

Oct. 1, 2013 Search Report issued in International Patent Application No. PCT/JP2013/068633.

*Primary Examiner* — Edgardo San Martin
(74) *Attorney, Agent, or Firm* — Oliff PLC

(57) ABSTRACT

A dash insulator is constructed by layering a front layer, a sound absorption layer of a membrane-vibration type and a perforated sound insulation layer. A layered body of the sound absorption layer and the perforated sound insulation layer is constructed such that the inner diameter and the opening ratio of opening portions of the perforated sound insulation layer are set to enable suppression of a resonance phenomenon between vibrations of the sound absorption layer and the perforated sound insulation layer in relation to low frequency range noise components of noise.

8 Claims, 8 Drawing Sheets

(51) Int. Cl.
B32B 5/18 (2006.01)
B60R 13/08 (2006.01)
G10K 11/168 (2006.01)
*E04B 1/74* (2006.01)
*F02B 77/11* (2006.01)

(56) References Cited

U.S. PATENT DOCUMENTS

| | | | | |
|---|---|---|---|---|
| 4,130,175 | A | * | 12/1978 | Hehmann ............... 181/290 |
| 4,237,178 | A | * | 12/1980 | Mazaki .................. 442/228 |
| 4,642,951 | A | * | 2/1987 | Mortimer ................ 52/145 |
| 5,058,705 | A | * | 10/1991 | Rheinlander ........... 181/287 |
| 5,196,253 | A | * | 3/1993 | Mueller et al. ......... 428/138 |
| 5,633,067 | A | * | 5/1997 | Illbruck et al. ......... 428/138 |
| 5,681,072 | A | * | 10/1997 | Stricker ................. 296/39.3 |
| 6,260,660 | B1 | * | 7/2001 | Yoerkie et al. ......... 181/290 |
| 6,345,688 | B1 | * | 2/2002 | Veen et al. ............. 181/290 |
| 7,080,712 | B2 | * | 7/2006 | Tsuiki et al. ........... 181/204 |
| 7,467,687 | B2 | * | 12/2008 | Mitchell et al. ........ 181/200 |
| 7,600,609 | B2 | * | 10/2009 | Nakamura .............. 181/290 |
| 8,499,887 | B2 | * | 8/2013 | Gleine et al. ........... 181/292 |
| 8,708,097 | B2 | * | 4/2014 | Borroni .................. 181/291 |
| 2004/0168853 | A1 | * | 9/2004 | Gunasekera et al. .... 181/290 |
| 2010/0108438 | A1 | * | 5/2010 | Duffy .................... 181/290 |
| 2011/0139542 | A1 | * | 6/2011 | Borroni .................. 181/290 |
| 2012/0279799 | A1 | * | 11/2012 | Graf ...................... 181/290 |

FOREIGN PATENT DOCUMENTS

| | | |
|---|---|---|
| JP | A 2003-19930 | 1/2003 |
| JP | A 2004-106733 | 4/2004 |
| JP | A 2009-90845 | 4/2009 |
| JP | A 2010-132024 | 6/2010 |

* cited by examiner

SOUNDPROOF BODY AND INSULATOR FOR MOTOR VEHICLES

BACKGROUND OF THE INVENTION

1. Field of the Invention

The present invention relates to a soundproof body suitable for soundproofing noise, and to an insulator for a motor vehicle suitable for soundproofing noise which propagates into a compartment of the motor vehicle, noise occurring in the compartment of the motor vehicle, or the like.

2. Description of the Related Art

Conventionally, in a soundproof body of this type, a soundproof material described in JP H07-081007A has been proposed. This soundproof material is constructed by laminating a skin layer, a first felt layer, an intermediate sheet layer, and a second felt layer in sequence.

Here, the skin layer is formed from, for example, a polyvinyl chloride resin sheet. The first felt layer is made of polypropylene resin felt. The intermediate sheet layer is formed from a polyvinyl chloride resin sheet, similarly to the skin layer.

In the intermediate sheet layer, vent openings are formed at an opening ratio in a predetermined range so as to attenuate vibration propagating from the second felt layer to the first felt layer. The second felt layer is made of reproduction cotton felt.

The soundproof material constructed in such a manner is arranged as a dash insulator along a dash panel which isolates an engine room and a compartment of a motor vehicle or a vehicle compartment from each other.

Herein, the dash insulator is fixed at its second felt layer to the dash panel and is located at the second felt layer, the intermediate sheet layer, the first felt layer, and the skin layer in this order in the vehicle compartment in order to soundproof the interior of the vehicle compartment from noise occurring in the engine room.

Incidentally, in the dash insulator constructed in the above manner, the first and second felt layers are made of felt as previously described. Thus, the first and second felt layers have air-permeability. Furthermore, the intermediate sheet layer has air-permeability because it has vent openings.

In this way, in the dash insulator, the first and second felt layers and the intermediate sheet layer are air-permeability. When noise, therefore, pass through the dash insulator, for instance, the intermediate sheet layer and the first felt layer of their laminating construction induce a resonance phenomenon which they promote vibrations together with each other under noise of low frequency range.

As a result, noise passing through the dash insulator from the second felt layer to the skin layer is increased, thereby to reduce transmission sound loss of noise in the dash insulator is reduced. This causes drawbacks that induce deterioration of soundproof effects as the dash insulator.

SUMMARY OF THE INVENTION

It is therefore an object of the present invention to provide a soundproof body and an insulator for motor vehicles capable of favorably securing soundproof effects to noise components of at least a low frequency range of noise by constructing a laminated body of a sound absorption layer of a membrane-vibration type and a perforated sound insulation layer so as to maintain vibrations of the laminated body within a range of a phase difference which can suppress a resonance phenomenon between each of vibrations of the sound absorption layer of the membrane-vibration type and the perforated sound insulation layer in relation to at least the noise components of the low frequency range of noise.

In order to solve the object according to the present invention, there is provided a soundproof body according to the present invention includes:

one side layer made of a porous material;

an intermediate layer layered on the one side layer; and an other side layer layered on the intermediate layer so as to oppose or face the one side layer through the intermediate layer, wherein the intermediate layer is formed from a sound absorption layer of a membrane-vibration type, and the other side layer is formed from a perforated sound insulation layer.

With such a construction as described above, when noise are incident on the soundproof body from the one side layer thereof, the noise are partially absorbed by the one side layer due to the porous material which is the forming material of the one side layer, and then are incident on the sound absorption layer of the membrane-vibration type, i.e. the intermediate layer, as remaining noise components.

Subsequently, the remaining noise components incident on the sound absorption layer of the membrane-vibration type are absorbed by the sound absorption layer of the membrane-vibration type due to its membrane vibration, and then are incident on the perforated sound insulation layer, i.e. the other side layer. Thereafter, the remaining noise components are insulated by the perforated sound insulation layer.

Herein, by layering the sound absorption layer of the membrane-vibration type, i.e. the intermediate layer between the one side layer and the perforated sound insulation layer, i.e. the other side layer, vibration of the laminated body of the sound absorption layer of the membrane-vibration type and the perforated sound insulation layer is maintained to suppress the resonance phenomenon between each of vibrations of the sound absorption layer of the membrane-vibration type and the perforated sound insulation layer in relation to the noise of the low frequency range.

Accordingly, it is possible to favorably secure both of sound absorption function based on the membrane vibration of the sound absorption layer of the membrane-vibration type and sound insulation function of the other side layer in relation to noise components of the low frequency range of noise.

As a result, the noise incident on the laminated body of the sound absorption layer of the membrane-vibration type with the perforated sound insulation layer can be favorably soundproofed by the sound absorption layer of the membrane-vibration type and the other side layer in the noise components of the low frequency range thereof.

According to an aspect of the present invention, the perforated sound insulation layer may be formed by a sound insulation material so as to include a plurality of opening portions in a dispersed manner, and the sound absorption layer of the membrane-vibration type may be formed from a non-air permeable thin-membrane layer made of a flexible material.

Herein, the above-mentioned opening ratio and the number of the plural opening portions of the perforated sound insulation layer may be set in a predetermined opening ratio range and a predetermined opening number range, respectively, so as to maintain a vibration of a laminated body of the non-air permeable thin-membrane layer and the perforated sound insulation layer in a predetermined phase difference range which suppresses a resonance phenomenon between each of vibrations of the non-air permeable thin-membrane layer and the perforated sound insulation layer under masses of the non-air permeable thin-membrane layer and the perforated sound insulation layer in relation to the noise components within the predetermined low frequency range of noise.

In this way, the opening ratio and the number of the plural opening portions of the perforated sound insulation layer may be set in the predetermined opening ratio range and the predetermined opening number range, respectively, so as to maintain the vibration of the laminated body of the non-air permeable thin-membrane layer, i.e. the sound absorption layer of the membrane-vibration type with the perforated sound insulation layer in the predetermined phase difference range which suppresses a resonance phenomenon between each of vibrations of the non-air permeable thin-membrane layer and the perforated sound insulation layer under masses of the non-air permeable thin-membrane layer and the perforated sound insulation layer in relation to the noise components within the predetermined low frequency range of noise.

Thus, even if the sound absorption layer of the membrane-vibration type is the non-air permeable thin-membrane layer made of the flexible material, as described above, the laminated body maintains its vibration in the predetermined phase difference range in relation to the noise components in the predetermined low frequency range of the noise, thereby to favorably secure both of the sound absorption characteristics based on the membrane vibration of the sound absorption layer of the membrane-vibration type and the sound insulating characteristics based on the vibration of the other layer so as to be capable of exerting excellent soundproofing effects.

Hence, under the aforementioned laminated structure of the laminated body, the noise components in the low frequency range of the incident noise are favorably absorbed based on the membrane vibration of the sound absorption layer of the membrane-vibration type and thereafter, noise components in a high frequency range of the incident noise can be favorably insulated by the other side layer. As a result, the aforementioned operation and effects of the present invention can further be improved.

According to another aspect of the present invention, even if the sound absorption layer of the membrane-vibration type is an air permeable thin membrane layer of a flexible material, it is possible to achieve the same substantial operation and effects as those in the case of a non-air permeable thin membrane layer made of a flexible material.

According to still another aspect of the present invention, the soundproof body further includes a skin layer which is layered on the perforated sound insulation layer so as to oppose the sound absorption layer of the membrane-vibration type through the perforated sound insulation layer, and is formed from a porous material.

Thus, even if noise from the sound absorption layer of the membrane-vibration type is partially transmitted through the perforated sound insulation layer, the transmitted noise can favorably be absorbed by the skin layer due to its forming material or the porous material in a high frequency range of the noise.

As a result, the soundproofing effects of the soundproof body against noise can further be improved over a wide frequency range of the noise on a basis of the sound absorption function of the sound absorption layer of the membrane-vibration type and the sound insulation function of the perforated sound insulation layer against noise of the aforementioned low frequency range, as well as on a basis of the sound absorption function of the skin layer against the noise of the high frequency range.

According to a further aspect of the present invention, the perforated sound insulation layer may be made of a sound insulation material so as to include a plurality of opening portions in a dispersed manner, and the sound absorption layer of the membrane-vibration type may be formed from an non-air permeable thin membrane layer made of a flexible material, wherein an opening ratio and the number of the plural opening portions of the perforated sound insulation layer may be set in a predetermined opening ratio range and a predetermined opening number range, respectively, so as to maintain a vibration of a laminated body of the sound absorption layer of the membrane-vibration type and the perforated sound insulation layer in a predetermined phase difference range which suppresses a resonance phenomenon between vibrations of the sound absorption layer of the membrane-vibration type and the perforated sound insulation layer under masses of the sound absorption layer of the membrane-vibration type and the perforated sound insulation layer in relation to noise components of a predetermined low frequency range of noise.

Accordingly, even if the sound absorption layer of the membrane-vibration type is the non-air permeable thin membrane layer made of the flexible material as described above, the laminated body maintains its vibration in the predetermined phase difference range in relation to the noise components of the predetermined low frequency range of the noise, thereby to favorably secure both of the sound absorption characteristics based on the membrane vibration of the sound absorption layer of the membrane vibration type or the non-air permeable thin membrane layer and the sound insulating characteristics based on the vibration of the other side layer so as to exert excellent soundproofing effects. And, in combination with such soundproofing effects, soundproofing effects based on the sound absorption function of the skin layer against the high frequency range noise can be achieved synergistically.

In other words, the laminated body vibrates in the predetermined phase difference range such that the sound absorption layer of the membrane-vibration type suppresses the resonance phenomenon between the vibrations of the other side layer due to its membrane vibration in relation to the noise components of the low frequency range of the noise incident thereon.

Consequently, the noise components of the low frequency range of the incident noise can favorably be absorbed based on the membrane vibration of the sound absorption layer the membrane-vibration type. Thereafter, the noise components of the high frequency range of the incident noise can be favorably insulated by the other side layer and be favorably absorbed by the skin layer. As a result, the soundproofing effects of the soundproof body can further be improved.

According to a still further aspect of the present invention, even if the sound absorption layer of the membrane-vibration type is an air permeable thin membrane layer made of a flexible material, the laminated body vibrates in the predetermined phase difference range such that the air permeable thin membrane layer suppresses the resonance phenomenon between the vibration of the other side layer due to the membrane vibration thereof in relation to the noise components of the low frequency range of the noise incident thereon in a manner similar substantially to the case of non-air permeable thin membrane layer made of a flexible material.

Consequently, the noise components of the low frequency range of the incident noise can favorably be absorbed based on the membrane vibration of the air permeable thin membrane layer. Thereafter, the noise components of the high frequency range of the incident noise can be favorably insulated by the other side layer and be favorably absorbed by the skin layer.

As a result, the soundproofing effects of the soundproof body can further be improved.

According to the present invention, there is provided an insulator for a motor vehicle which is mounted on a part of a vehicle body of the motor vehicle.

The insulator comprises a soundproof body which includes one side layer formed from a porous material to be mounted on the part of the vehicle body, an intermediate layer layered on the one side layer, and an other side layer layered on the intermediate layer so as to oppose the one side layer through the intermediate layer.

And, in the soundproof body, the intermediate layer is constructed by a sound absorption layer of a membrane-vibration type which is formed from a non-air permeable membrane layer or an air permeable membrane layer made of a flexible material, and the other side layer is constructed by a perforated sound insulation layer made of a sound insulation material so as to include a plurality of opening portions in a dispersed manner, wherein an opening ratio and the number of the plural opening portions of the perforated sound insulation layer are set in a predetermined opening ratio range and a predetermined opening number range, respectively, so as to maintain a vibration of a laminated body of the sound absorption layer of the membrane-vibration type with the perforated sound insulation layer in a predetermined phase difference range which suppresses a resonance phenomenon between vibrations of the sound absorption layer of the membrane-vibration type and the perforated sound insulation layer under masses of the sound absorption layer of the membrane-vibration type and the perforated sound insulation layer in relation to noise components of a predetermined low frequency range of noise.

Accordingly, the insulator for the motor vehicle can favorably perform soundproofing against noise propagating to its mounted portion by the soundproofing function of the soundproof body as constructed above.

Herein, in the insulator for the motor vehicle according to the present invention, the soundproof body may further include a skin layer which is layered on the other side layer so as to oppose the intermediate layer through the other side layer, and is formed from a porous material.

Thus, even if the noise are incident partially on the perforated sound insulation layer or the other side layer through the one side layer and the sound absorption layer of the membrane-vibration type or the intermediate layer and is thereafter transmitted partially through the perforated sound insulation layer, the transmitted noise can be favorably absorbed by the skin layer due to its material or the porous material in the high frequency range of the noise.

As a result, the soundproofing effects of the insulator against noise can further be improved over a wide frequency range of the noise on a basis of both of the sound absorption function of the sound absorption layer of the membrane-vibration type and the sound insulation function of the perforated sound insulation layer against the noise of the aforementioned low frequency range and the sound absorption function of the skin layer against the noise of the high frequency range.

According to a still further aspect of the present invention, there is provided an insulator for a motor vehicle which is used as a dash insulator and mounted on a part of a vehicle body of the motor vehicle, and which comprises a soundproof body which includes one side layer formed from a porous material and mounted from an inside of a vehicle compartment of the vehicle body on a dash panel which separates an engine room and the vehicle compartment, an intermediate layer layered on the one side layer and an other side layer layered on the intermediate layer so as to oppose the one side layer through the intermediate layer.

In the soundproof body, the intermediate layer is constructed by a sound absorption layer of a membrane-vibration type which is formed from a non-air permeable membrane layer or an air permeable membrane layer made of a flexible material, and the other side layer is constructed by a perforated sound insulation layer which is made of a sound insulation material so as to include a plurality of opening portions in a dispersed manner.

An opening ratio and the number of the plural opening portions of the perforated sound insulation layer are set in a predetermined opening ratio range and a predetermined opening number range, respectively, so as to maintain a vibration of a laminated body of the sound absorption layer of the membrane-vibration type and the perforated sound insulation layer in a predetermined phase difference range which suppresses a resonance phenomenon between vibrations of the sound absorption layer of the membrane-vibration type and the perforated sound insulation layer due to masses of the sound absorption layer of the membrane-vibration type and the perforated sound insulation layer in relation to noise components of a predetermined low frequency range of noise.

In this way, even if the aforementioned insulator of the present invention is the dash insulator as described above, it is possible to favorably perform soundproof against noise propagating from the engine room through the dash panel by the soundproofing function of the soundproof in the same as the soundproofing function as the aforementioned insulator.

Herein, in the insulator of the motor vehicle as the dash insulator as described above, the soundproof body may further include a skin layer which is layered on the other side layer so as to oppose the intermediate layer through the other side layer and is made of a porous material.

Consequently, in the insulator as the dash insulator, even if the noise from the dash panel are partially incident on the perforated sound insulation layer or the other side layer through the one side layer and the sound absorption layer of the membrane-vibration type or the intermediate layer, the transmitted noise can favorably be absorbed by the skin layer due to its forming material or the porous material in the high frequency range of the noise.

As a result, the soundproofing effects of the insulator against noise as the dash insulator can further be improved over a wide frequency range of the noise on a basis of both of the sound absorption function of the sound absorption layer of the membrane-vibration type and the sound insulation function of the perforated sound insulation layer against the aforementioned noise of the low frequency range and the sound absorption function of the skin layer against the noise of the high frequency range.

BRIEF DESCRIPTION OF THE DRAWINGS

Other features and advantages of the invention will be apparent from the following description taken in connection with the accompanying drawings.

DETAILED DESCRIPTION OF THE PREFERRED EMBODIMENTS

Hereinafter each embodiment of the present invention will be described below, referring to the attached drawings.

Figure 1:
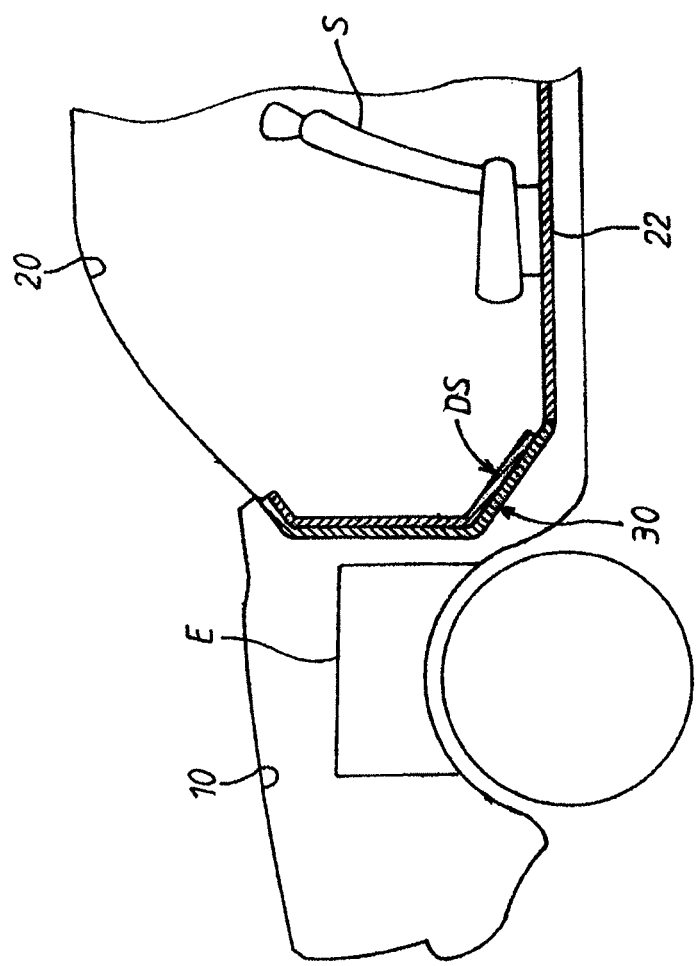
FIG. 1 is a partial diagrammatic cross-sectional view schematically showing a motor vehicle to which a first embodiment of a dash insulator according to the present invention is applied.

FIG. 1 shows a first embodiment of the present invention applied to a motor vehicle. The motor vehicle is provided with an engine room 10 and a vehicle compartment 20. In the motor vehicle, the vehicle compartment 20 is located subsequently to the engine room 10. An engine E is arranged inside the engine room 10. A front seat S is arranged inside the vehicle compartment 20.

The motor vehicle is also provided with a dashboard 30 (called as a dash panel 30). The dashboard 30 is, as shown in the longitudinal cross-section of FIG. 1, extended and formed such that it is slantingly bent at its upper and lower side portions rearward toward the upward and downward directions from a central portion thereof.

The dashboard 30 constructed in such a way is arranged on a boundary between the engine room 10 and the vehicle compartment 20, thereby to separate the engine room 10 and the vehicle compartment 20 from each other.

In addition, the dashboard 30 is joined at its extended upper end portion to a lower edge portion of a front windshield of the vehicle compartment 20, and is joined at is extended lower end portion to a front edge portion of a floor wall of the vehicle compartment 20.

Figure 2:
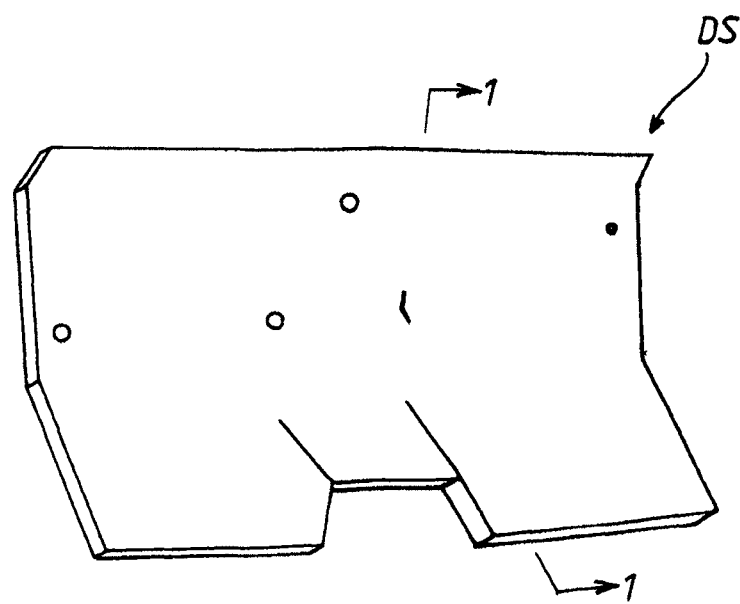
FIG. 2 is a perspective view showing the dash insulator of FIG. 1.

The motor vehicle is further provided with a dash insulator DS. The dash insulator DS is, as shown in FIG. 1, assembled along the dashboard 30 from the side of the vehicle compartment 20. As shown in FIG. 2, the dash insulator DS is constructed at its upward-and-downward center portion in the shape of a curved board which becomes to be concave toward the front side of the motor vehicle when viewing from the rear side of the motor vehicle.

Figure 3:
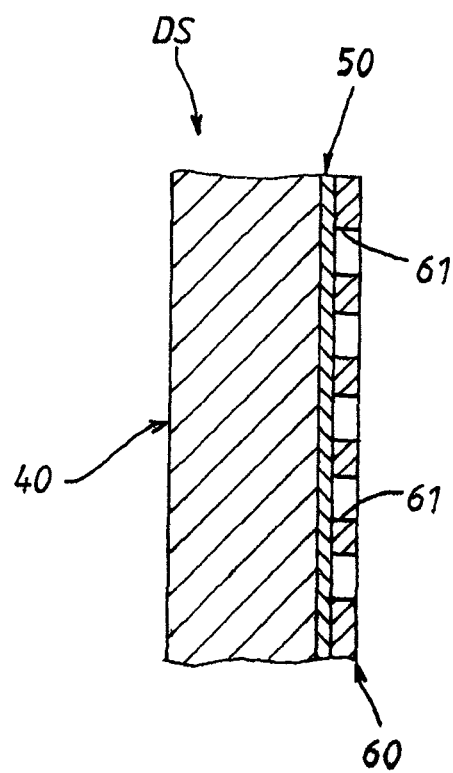
FIG. 3 is a partial enlarged longitudinal cross-sectional view showing the dash insulator taken along the line 1-1 of FIG. 2.
Figure 4:
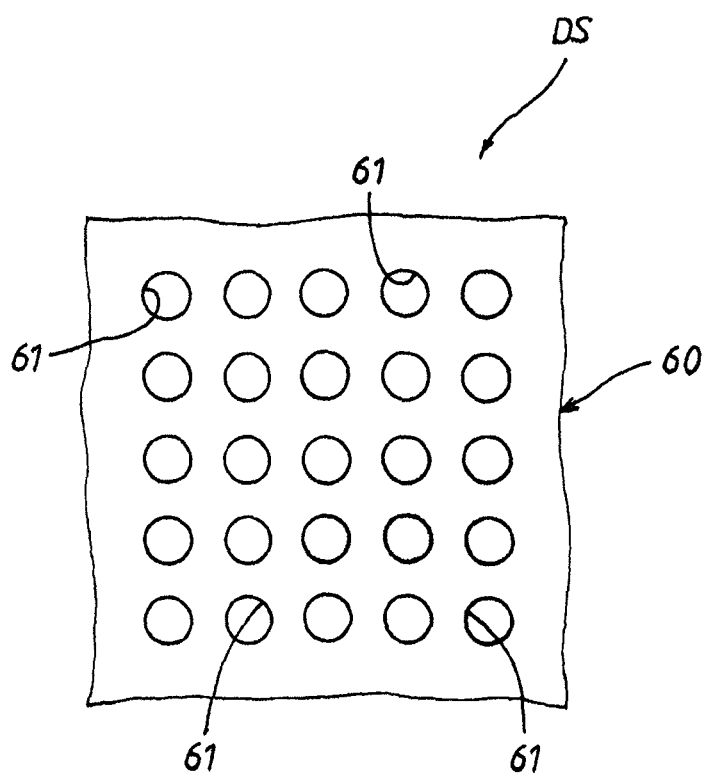
FIG. 4 is a partial cutaway front view showing the dash insulator of FIG. 3.

As shown in FIG. 3 or 4, the dash insulator DS includes a front layer 40, an intermediate layer 50 and a rear layer 60, which are layered in sequence from the front side to the rear side of the motor vehicle.

The front layer 40 is formed from a predetermined porous material so as to act as a sound absorption layer. As shown in the longitudinal cross-section of FIG. 1, the front layer 40 is extended and formed along the dashboard 30 such that it is slantingly bent at its upper and lower side portions in the rearward and upward-and-downward directions from a central portion thereof. This means that the front layer 40 is mounted at its front surface along a rear surface of the dashboard 30. In the first embodiment, as the above-mentioned predetermined porous material, adopted is felt having a basis weight of 1400 (g/m$^2$).

Herein, the front layer 40 acts as a sound absorption layer which absorbs noise proceeding from the inside of the engine room 10 toward the inside of the vehicle compartment 20 through the dash panel 30.

The intermediate layer 50 is formed along the front layer 40 in a curved shape similarly to the front layer 40 and is, as shown in FIG. 3, sandwiched and supported between the front layer 40 and the rear layer 60. Herein, the intermediate layer 50 is formed from a flexible non-air permeable thin membrane layer so as to act as a sound absorption layer of a membrane-vibration type (hereinafter also called as a sound absorption layer 50 of a membrane-vibration type).

In other words, the intermediate layer 50 acts as the sound absorption layer of the membrane-vibration type which receives noise from the front layer 40 and vibrates to absorb the noise.

In the first embodiment, the non-air permeable thin membrane layer or the sound absorption layer 50 of the membrane-vibration type receives noise and generates membrane vibration. Herein, membrane vibration of the non-air permeable thin membrane layer itself triggers a resonance phenomenon in relation to low frequency noise components in a predetermined low frequency range of the noise. In the first embodiment, the above-mentioned non-air permeable thin membrane layer is formed from, for example, a single film layer having a thickness of approximately several millimeters. As a forming material of the film layer, adopted is polyethylene resin of 50 (g/m$^2$).

The rear layer 60 is formed from a predetermined sound insulation material in the form of the same curved shape as that of the intermediate layer 50 as a perforated sound insulation layer (hereinafter called as a perforated sound insulation layer 60), and is, as shown in FIG. 3, layered along the intermediate layer 50 so as to face or oppose the front layer 40 through the intermediate layer 50.

In the first embodiment, as the predetermined sound insulation material, adopted is a rubber-based resin material which has a thickness of 2 (mm) and a basis weight of 3400 (g/m$^2$).

The perforated sound insulation layer 60 or the rear layer 60 has, as exemplarily shown in FIG. 3 or 4, a plurality of circular opening or aperture portions 61, which are formed over the entire surface of the rear layer 60 in a dispersed manner.

In the first embodiment, the inner diameter (opening diameter) of each opening portion 61 of the rear layer 60 is 20 (mm). The opening ratio of the opening portions 61 of the rear layer 60 is 25(%). In addition, the opening ratio is a ratio of a sum of opening areas of all of the opening portions 61 to an entire area of the surface (rear surface) of the rear layer 60.

In the present first embodiment, the opening ratio and the number of the opening portions 61 are set in a predetermined opening ratio range and a predetermined opening number range, respectively, in the rear layer 60 so as to maintain vibration of a laminated or layered body of the sound absorption layer 50 of the membrane-vibration type or the intermediate layer 50 and the rear layer 60 in a predetermined phase difference range which can suppress a resonance phenomenon between the membrane vibration of the sound absorption layer 50 of the membrane-vibration type and vibration of the rear layer 60 in relation to noise components having frequencies in a predetermined low frequency range (200

(Hz) to 500 (Hz)) out of a frequency range (200 (Hz) to 6300 (Hz)) of noise targeted for soundproofing by the dash insulator DS.

In other words, the laminated body is constructed as a laminated structure of the sound absorption layer 50 of the membrane-vibration type with the rear layer 60 having the aforementioned opening construction, thereby to set the opening ratio and the number of the opening portions 61 in the predetermined opening ratio range and the predetermined opening number range, respectively, on a bases of the masses of the sound absorption layer 50 and the rear layer 60 so as to maintain the vibration in the predetermined phase difference range capable of suppressing the resonance phenomenon between the membrane vibration of the sound absorption layer 50 and the vibration of the rear layer 60.

Herein, in the present first embodiment, the grounds in which the predetermined opening ratio range and the predetermined opening number range are introduced to the opening portions 61 of the rear layer 60, as described above will be described in detail.

The inventor of the present invention further prepared a large number of laminated bodies each of which was a laminated structure of a sound absorption layer of a membrane-vibration type and a rear layer respectively corresponding to the sound absorption layer 50 of the membrane-vibration type or the non-air permeable thin membrane layer and the rear layer 60 or the perforated sound insulation layer. In this case, the masses of the sound absorption layer of the membrane-vibration type and the rear layer and the opening areas and the number of the opening portions were changed in various ways.

As a result of performing studies variously regarding these laminated bodies through experiments or the like, the inventor of the present invention found that vibration of each laminated body can be set by a comprehensive adjustment of the masses of the sound absorption layer of the membrane-vibration type and the rear layer and the opening surface and the number of opening portions so as to be able to maintain vibration within a predetermined phase difference range which is capable of suppressing a resonance phenomenon between vibrations of the sound absorption layer of the membrane-vibration type and the rear layer in relation to noise components of a low frequency range of noise.

And, the inventor also found a phenomenon that an increase of a transmission sound loss of noise or lowering of sound or acoustic sensitivity, in other words, decrease of the noise can be ensured by causing each laminated body to vibrate with a phase difference which suppresses a resonance phenomenon in the above manner.

In the present embodiment, the predetermined phase difference range mentioned above corresponds to a range of difference, for example, from 100 (Hz) or higher to 1600 (Hz) or lower in a frequency of a vibration.

In addition, the reason why the above-mentioned predetermined phase difference range is set to be 100 (Hz) or higher is because it is impossible to obtain sound absorption effects and sound insulation effects as the laminated body, in case the laminated body has a thickness and a mass corresponding to a board thickness and a mass of a general product serving as a conventional dash insulator when the above-mentioned predetermined phase difference range is lower than 100 (Hz). And when the above-mentioned predetermined phase difference range is higher than 1600 (Hz), it is difficult to trigger the resonance phenomenon in the laminated body.

Furthermore, it has been found that the above mentioned phenomenon may not bring a sum of both of a noise reduction effect based on an adjustment of the mass of the sound absorption layer of the membrane-vibration type and a noise reduction effect based on an adjustment of the mass, opening surface and number of the opening portions of the rear layer and that the above mentioned phenomenon may easily bring a unique noise reduction effect capable of easily reducing noise more favorably differing from the above-mentioned sum on a basis of a comprehensive adjustment of the mass of the sound absorption layer of the membrane-vibration type and the mass, opening surface and number of the opening portions of the rear layer.

Under the grounds as described above, in the first embodiment, the predetermined opening ratio range and the predetermined opening number range are set in the above manner such that the laminated body of the sound absorption layer of the membrane-vibration type and the rear layer maintains vibration thereof in the predetermined phase difference range which suppresses the resonance phenomenon between the vibrations of the sound absorption layer of the membrane-vibration type and the rear layer in relation to the noise components of the predetermined low frequency range of noise.

Accordingly, the laminated body maintains its vibration in the predetermined phase difference range, thereby to be capable of ensuring favorably the both of sound absorption characteristics based on membrane vibration of the sound absorption layer of the membrane-vibration type and sound insulation characteristics based on vibration of the rear layer in relation to the noise components of the predetermined low frequency range of noise so as to exert excellent soundproofing effects.

In the present first embodiment with the above-described construction, when the engine E generates engine sound as noise upon the actuation thereof, the noise is incident on the dash insulator DS through the dash panel 30. Herein, because the dash panel 30 is formed from an iron board, the noise incident on the dash panel 30 are insulated partially by the dash panel 30 under the non-air permeability of the dash panel 30 and then is incident on the dash insulator DS. In other words, noise components transmitted through the dash panel 30 out of the noise are incident on the dash insulator DS.

When the noise components transmitted through the dash panel 30 out of the noise are incident on the dash insulator DS in the above manner, the noise components are incident on the front layer 40 adjacent to the dash panel 30.

Herein, the front layer 40 acts as the sound absorption layer made of felt which is the predetermined porous material as mentioned earlier. Thus, the noise components incident on the front layer 40 are partially absorbed by the front layer 40 under the air permeability of the front layer 40 to be incident on the intermediate layer 50.

In other words, noise components which are remained after absorption by the front layer 40 against the noise components incident on the front layer 40 remaining noise components are incident on the intermediate layer 50 as remaining noise components.

Herein, the intermediate layer 50 is the sound absorption layer of the membrane-vibration type formed from the single film layer which is the non-air permeable thin membrane layer, as described above.

Since the sound absorption layer 50 of the membrane-vibration type is also a sound absorption layer, the remaining noise components incident on the intermediate layer 50, that is to say, the sound absorption layer 50 of the membrane-vibration type, as previously are partially absorbed by the sound absorption layer 50 of the membrane-vibration type under the membrane vibration of the sound absorption layer 50, and then are incident on the rear layer 60.

In other words, the remaining sound components incident on the sound absorption layer 50 of the membrane-vibration type, as described above are partially absorbed by the sound absorption layer 50 in the predetermined low frequency range thereof, and noise components remaining after this absorption are incident on the rear layer 60 as further remaining noise components.

In addition, these further remaining noise components incident on the rear layer 60 are constructed by low frequency noise components in the above-described predetermined low frequency range and high frequency noise components out of the remaining noise components incident on the sound absorption layer 50.

Furthermore, the rear layer 60 is formed from the rubber-based resin material being one type of the predetermined sound insulation material, as described above. Therefore, the rear layer 60 exerts favorable sound insulation characteristics in a predetermined high frequency range (a frequency range which is higher than 500 (Hz) or equal to and lower than 6300 (Hz) or equal to.) of noise.

Further, the rear layer 60 is formed at each opening portion thereof so as to satisfy the opening ratio in the above-mentioned predetermined opening ratio range and the opening number in the above-mentioned predetermined opening number range under the laminated construction with the intermediate layer 50, as previously described. Moreover, these opening portions 61 are formed in consideration of the masses of the intermediate layer 50 and the rear layer 60 as described above.

Accordingly, the laminated body is constructed such that it maintains its vibration in the predetermined phase difference range in relation to the noise components of the predetermined low frequency range of the noise, thereby to favorably ensure both sound absorption characteristics based on the membrane vibration of the sound absorption layer of the membrane-vibration type and sound insulation characteristics based on the vibration of the rear layer so as to exert excellent soundproofing effects.

Therefore, in the process in which the remaining noise components incident on the sound absorption layer 50 of the membrane-vibration type pass through the sound absorption layer 50 and then are incident on the rear layer 60 as the further remaining noise components, the laminated body vibrates in the predetermined phase difference range such that the sound absorption layer 50 suppresses at its membrane vibration the resonance phenomenon with the vibration of the rear layer 60 in relation to the noise components in the predetermined low frequency range out of the above-mentioned remaining noise components, as described above.

Thus, the remaining noise components are favorably absorbed based on the membrane vibration of the sound absorption layer 50, and then incident on the rear layer 60 as the further remaining noise components, which are insulated favorably by the rear layer 60 in the predetermined high frequency range, as described above.

In the above manner, the remaining noise components incident on the sound absorption layer 50 are favorably absorbed by the sound absorption layer 50 in the predetermined low frequency range, and then are favorably insulated by the rear layer 60 in the predetermined high frequency range.

This means that the laminated body of the sound absorption layer 50 of the membrane-vibration type and the rear layer 60 can favorably perform soundproofing against the engine sound over the low and high frequency ranges of the engine sound. As a result, even if the noise propagates into the inside of the vehicle compartment 20 through the rear layer 60, the noise can be reduced to the extent that passengers of the motor vehicle do not care much about the noise.

Furthermore, in the dash insulator DS, only the sound absorption layer of the membrane-vibration type formed from the single film is interposed as the intermediate layer 50 between the front layer 40 and the rear layer 60 constructed as previously described.

Therefore, the dash insulator DS is of course lightweight, and the thickness thereof hardly changes with thickness of the thickness of a conventional two-layer construction (a two-layer construction of a front layer and a rear layer) without the intermediate layer 50. For this reason, even though the dash insulator DS additionally includes the intermediate layer 50, the dash insulator DS can be interposed between the dash panel 30 and an instrument panel without any difficulties.

As described above, in the present first embodiment, the dash insulator DS is formed so as to have the above-mentioned construction at its laminated body of the sound absorption layer 50 of the membrane-vibration type and the rear layer 60. Therefore, the noise from the engine room 10 are favorably absorbed by the sound absorption layer 50 in the predetermined low frequency range and are favorably insulated in the above-mentioned predetermined high frequency range.

Thus, the soundproofing effects of the dash insulator DS against the noise can be favorably achieved over both of the predetermined low and high frequency ranges of the noise.

Incidentally, using the dash insulator DS constructed as described above as a working example 1a, sound or acoustic sensitivity characteristics of the working example 1a have been measured in relation to frequencies of noise. Also, for this measurement, a comparative example 1b has been prepared and acoustic sensitivity characteristics of this comparative example 1b have been measured as well.

In addition, the acoustic sensitivity of the acoustic sensitivity characteristics is an index showing how easily sound is transmitted, and indicates the loudness of sound. The noise described above denotes noise including sound (engine sound) from the engine E and other sound.

Herein, the comparative example 1b is constructed as a two-layer laminated body of the front layer 40 and a non-air permeable rear layer corresponding to the rear layer 60 of the dash insulator DS excluding the intermediate layer 50. In other words, the comparative example 1b is constructed as a two-layer laminated body of the front layer 40 and a rear layer formed from an insulation material without any opening portions. Additionally, a basis weight of the comparative example 1b is 4800 (g/m$^2$) and is heavier than the working example 1a.

Figure 5:
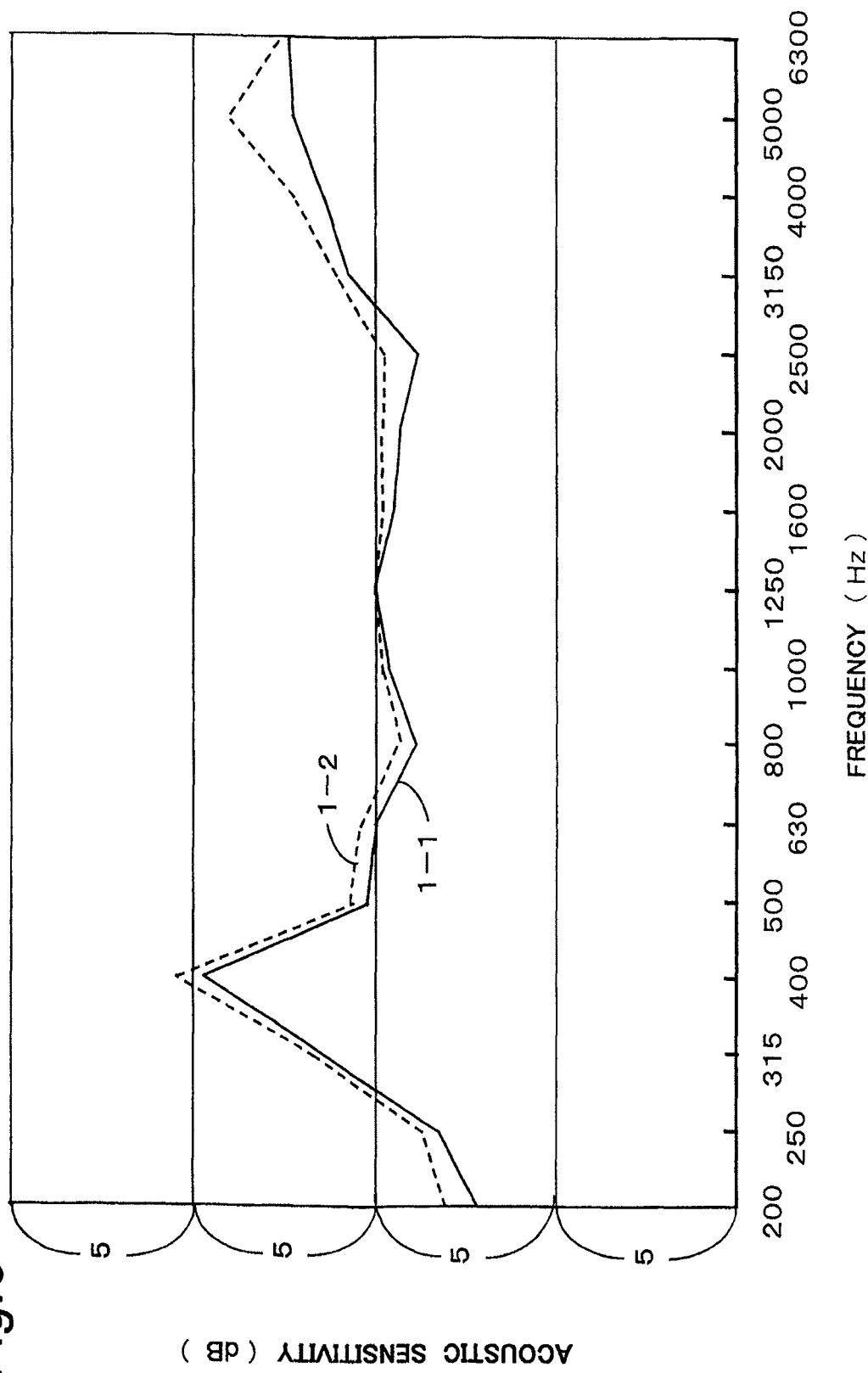
FIG. 5 shows graphs of acoustic sensitivity characteristics of a working example and a comparative example according to the first embodiment in relation to frequencies of engine sound.

As a result of measuring the acoustic sensitivity characteristics of the aforementioned working example 1a and comparative example 1b, graphs 1-1 and 1-2 have been obtained as line graphs shown in FIG. 5. The graph 1-1 shows the acoustic sensitivity characteristics of the working example 1a, whereas the graph 1-2 shows the acoustic sensitivity characteristics of the comparative example 1b.

According to these graphs 1-1 and 1-2, it is apparent that the acoustic sensitivity of the working example 1a is lower than the acoustic sensitivity of the comparative example 1b, except a portion of a frequency range (200 (Hz) to 6300 (Hz)) for noise measurement and that in at least a predetermined low frequency range (200 (Hz) to 500 (Hz)), the acoustic sensitivity of the working example 1a is clearly lower than the acoustic sensitivity of the comparative example 1b.

This means that the working example 1a insulates the noise of the predetermined low frequency range more in comparison with the comparative example 1b, thereby to become a construction which is hard to convey noise.

This is considered to be based on the reason that because the working example 1a has a construction in which the sound absorption layer 50 of the membrane-vibration type is interposed between the front layer 40 and the rear layer 60, differing from the comparative example 1b, the sound absorption layer 50 suppresses the resonance phenomenon between the vibrations of the sound absorption layer 50 and the rear layer 60 under the aforementioned construction of the rear layer 60 in relation to noise of the predetermined low frequency range, differing from the comparative example 1b.

Next, using the working example 1a, which is the dash insulator DS, as a working example 2a, and the transmission sound loss characteristics of the working example 2a have been measured in relation to frequencies of noise.

As will be described later, for this measurement, working examples 2b, 2c and 2d each of which opening portions of the rear layer have the same opening ratio as those of the working example 2a have been also prepared, and comparative examples 2e and 2f have been prepared as well. And the transmission sound loss characteristics of these working examples 2b, 2c and 2d and the comparative examples 2e and 2f have been measured.

In addition, the transmission sound loss of the transmission sound loss characteristics is a difference between incident sound and transmitted sound. Herein, because the smaller the difference, the more the transmitted sound, the lower the transmission sound loss, the worse the sound insulation performance.

Conversely, because the larger the difference, the less the transmitted sound, the higher the transmission sound loss, the better the sound insulation performance. Thus, the higher the transmission sound loss, the lower the acoustic sensitivity. Conversely, the lower the transmission sound loss, the higher the acoustic sensitivity.

Herein, because the working example 2a is the aforementioned dash insulator DS, the opening ratio of the opening portions 61 of the rear layer 60 is 25(%). Furthermore, each of the working examples 2b, 2c and 2d has a three-layer construction similarly to the working example 2a, and is constructed by a front layer, a sound absorption layer of a membrane-vibration type and a rear layer corresponding to the front layer 40, the sound absorption layer 50 of the membrane-vibration type and the rear layer 60, respectively.

A basis weight of each of the working examples 2b, 2c and 2d is 3950 (g/m$^2$) similarly to that of the working example 1a. In each of the working examples 2b, 2c and 2d, opening portions of the sound absorption layer of the membrane-vibration type have an opening ratio of 25(%) similarly to that of the opening portions 61 of the rear layer 60.

However, each opening portion of the sound absorption layer of the membrane-vibration type of the working example 2b has an inner diameter of 20 (mm), each opening portion of the sound absorption layer of the membrane-vibration type of the working example 2c has an inner diameter of 40 (mm), and each opening portion of the sound absorption layer f the membrane-vibration type of the working example 2d has an inner diameter of 80 (mm).

Furthermore, with regard to the comparative examples 2e and 2f, the comparative example 2e corresponds to the dash panel 30 and is formed from an iron board having a thickness of 0.8 (mm). The comparative example 2f has the same construction as that of the aforementioned comparative example 1b.

As mentioned earlier, the transmission sound loss characteristics of the working examples 2a to 2d and the comparative examples 2e and 2f have been measured. As a result of the measurement, graphs 2-1 to 2-6 have been obtained as line graphs shown in FIG. 6. The graph 2-1 shows the transmission sound loss characteristics of the working example 2a. The graphs 2-2, 2-3 and 2-4 show the transmission sound loss characteristics of the working examples 2b, 2c and 2d, respectively. The graphs 2-5 and 2-6 show the transmission sound loss characteristics of the comparative examples 2e and 2f, respectively.

Herein, the graphs 2-1 to 2-6 are compared with one another. In each of the working examples 2a to 2d, the opening ratio of the opening portions is the same 25(%), as described above, but the inner diameter of the opening portion is different from each other. Specifically, the inner diameter is increased to be 10 (mm), 20 (mm), 40 (mm) and 80 (mm) from the working example 2a to the working example 2d in sequence.

Comparing the graphs 2-1 to 2-4 with one another in a range of frequencies from 200 (Hz) to 500 (Hz), it is apparent that in the graphs 2-1 to 2-4, the transmission sound losses are in the increasing tendency from the frequency 200 (Hz) to the frequency 500 (Hz).

On the other hand, with regard to the two comparative examples 2e and 2f, the comparative example 2e has simply one-layer structure made up of the iron board, as described above, differing from the three-layer structures of the working examples 2a to 2d.

Also, the comparative example 2f has a two-layer structure without the sound absorption layer of the membrane-vibration type, that is to say, a two-layer structure made up of the front layer 40 and the non-air permeable rear layer corresponding to the rear layer 60 (the rear layer made of the sound insulation material without any opening portions), as described above, differing from the three-layer structure of each of the working examples 2a to 2d.

In view of the above, comparing the graphs 2-1 to 2-4 with the graphs 2-5 and 2-6, it is apparent that the transmission sound loss of the graph 2-1 is in the decreasing tendency in comparison with the transmission sound loss of the graph 2-5 in a frequency range of 200 (Hz) to about 315 (Hz), but is in the increasing tendency in comparison with the transmission sound loss of the graph 2-5 in a range of frequencies equal to or higher than about 315 (Hz).

This means that the sound insulation characteristics of the working example 2a are in the lowering tendency compared to the sound insulation characteristics of the comparative example 2e in a range of the frequency of 200 (Hz) to the frequency of about 315 (Hz), but are in the rising tendency compared to the sound insulation characteristics of the comparative example 2e in the range of frequencies equal to or higher than about 315 (Hz).

Therefore, the sound insulation characteristics of the working example 2a are more favorable than those of the comparative example 2e with respect to noise in the range of frequencies of at least about 315 (Hz) to 500 (Hz) out of noise of the predetermined low frequency range.

Next, it is apparent that the transmission sound loss of the graph 2-1 is in the increasing tendency together with the transmission sound loss of the graph 2-6 in a range of frequencies of 200 (Hz) to about 1250 (Hz). Herein, the sound insulation characteristics of the working example 2a are substantially higher than the sound insulation characteristics of the comparative example 2f in some degree in a range of frequencies of 200 (Hz) to about 1250 (Hz).

Therefore, it can be said that the sound insulation characteristics of the working example 2a of which the opening portions have the inner diameter of 10 (mm) and have the opening ratio of 25(%) are more favorable than those of the comparative example 2f with respect to noise of at least the predetermined low frequency range.

Furthermore, it is understand that in a range of frequencies of 200 (Hz) to 500 (Hz), the transmission sound losses of the graphs 2-2 to 2-4 are in the substantially increasing tendency compared to the transmission sound loss of the graph 2-5, but a frequency range which is in the increasing tendency compared to the transmission sound loss of the graph 2-6 narrows gradually from the graph 2-2 to the graph 2-4.

This means that the sound insulation characteristics of each of the working examples 2b to 2d which are constructed so as to gradually increase the inner diameter of each of the opening portions thereof at the opening ratio of 25(%), as described above are more favorable than those of the comparative example 2e but narrow at a frequency range being more favorable than those of the comparative example 2f, with respect to the noise of the predetermined low frequency range.

According to the above description, in the case where the opening portions have the opening ratio of 25(%), the sound insulation characteristics, namely, soundproofing characteristics of the working example can be obtained favorably compared with those of the comparative examples 2e and 2f, as the inner diameter of the opening portions of the working example become smaller gradually in a range larger than 10 (mm), but the smaller the inner diameter, the narrower the frequency range in which favorable soundproofing can be ensured.

In addition, the transmission sound loss characteristics of each of the working examples 2b to 2d are maintained between the transmission sound loss characteristics of the comparative example 2e and the transmission sound loss characteristics of the comparative example 2f in a range of the inner diameter of each opening portion larger than 10 (mm) with regard to noise of the predetermined high frequency range.

Further, a working example 3a corresponding to the working example 1a, which is the aforementioned dash insulator DS, has been prepared, and the transmission sound loss characteristics of this working example 3a have been measured in relation to frequencies of noise.

As will be described later, for this measurement, working examples 3b to 3e have been also prepared, and comparative examples 3f and 3g have been prepared as well. In this case, an opening diameter of each opening portion which is formed to a rear layer of each of the working examples 3b to 3e is the same as that of the opening diameter of each opening portion which is formed to the rear layer of the working example 3a. And, the transmission sound loss characteristics of each of these working examples 3b to 3e and comparative examples 3f and 3g have been measured.

Herein, the working examples 3a to 3e are respectively constructed to have a three-layer structure of a front layer, a sound absorption layer of a membrane-vibration type and a rear layer corresponding to the front layer 40, the sound absorption layer 50 of the membrane-vibration type and the rear layer 60 of the working example 1a. These working examples 3a, 3b, 3c, 3d and 3e have basis weights of 4630 (g/m$^2$), 4290 (g/m$^2$), 3950 (g/m$^2$), 3610 (g/m$^2$) and 3270 (g/m$^2$), respectively.

Furthermore, the opening portions (corresponding to the opening portions 61 of the working example 1a) of the rear layers of the working examples 3a and 3b have opening ratios of 5(%) and 15(%), respectively. The opening portions of the rear layers of the working examples 3c, 3d and 3e (corresponding to the opening portions 61 of the working example 1a) have opening ratios of 25(%), 35(%) and 45(%), respectively. Moreover, the opening portions of the rear layers of the working examples 3a to 3e all have an inner diameter of 20 (mm). Additionally, the working example 3c is the same as the aforementioned working example 2b.

With regard to the comparative examples 3f and 3g, the comparative example 3f is formed from an iron board having a thickness of 0.8 (mm) similarly to the aforementioned comparative example 2e. The comparative example 3g is constructed by a two-layer structure of a front layer and a rear layer similarly to the aforementioned comparative example 2f, in other words, a two-layer structure of a front layer and a rear layer which is formed from a sound insulation material without any opening portions.

As mentioned earlier, the transmission sound loss characteristics of the working examples 3a to 3e and the comparative examples 3f and 3g have been measured. As a result, graphs 3-1 to 3-7 have been obtained as line graphs shown in FIG. 7.

The graphs 3-1 and 3-2 show the transmission sound loss characteristics of the working examples 3a and 3b, respectively. The graph 3-3 shows the transmission sound loss characteristics of the working example 3c (the same as the graph 2-2 showing the transmission sound loss characteristics of the working example 2b). The graphs 3-4 and 3-5 show the transmission sound loss characteristics of the working examples 3d and 3e, respectively.

The graph 3-6 shows the transmission sound loss characteristics of the comparative example 3f (the same as the graph 2-5 showing the transmission sound loss characteristics of the comparative example 2e). The graph 3-7 shows the transmission sound loss characteristics of the comparative example 3g (the same as the graph 2-6 showing the transmission sound loss characteristics of the comparative example 2f).

Herein, these graphs 3-1 to 3-7 are compared with one another. The opening portions of the working examples 2a to 2e all have the same inner diameter of 20 (mm), but have different opening ratios, as described above. Specifically, opening ratios of the opening portions of the working examples 2a to 2e are 5(%), 15(%), 25(%), 35(%) and 45(%), respectively, are in the gradually increasing tendency.

Comparing the graphs 3-1 to 3-5 with one another in a range of frequencies of 200 (Hz) to 500 (Hz), it is apparent that the transmission sound losses of the graphs 3-1 to 3-5 are all in the substantially similar increasing tendency from the frequency of 200 Hz to the frequency of 500 Hz.

On the other hand, with regard to the two comparative examples 3f and 3g, the comparative example 3f is formed from one-layer iron board in the same manner as the aforementioned comparative example 2e. The comparative example 3g has a two-layer structure without the sound absorption layer of the membrane-vibration type in the same manner as the aforementioned comparative example 2f.

In view of the above, the graphs 3-1 to 3-5 are compared with the graphs 3-6 and 3-7 in a range of frequencies of 200 (Hz) to 500 (Hz).

Herein, it is apparent that the transmission sound losses of each of the graphs 3-1 to 3-5 are, substantially as a whole, in increasing tendency compared to the transmission sound losses of the graph 3-6 in the range of frequencies of 200 (Hz) to 500 (Hz). Therefore, the sound insulation characteristics of the working examples 3a to 3e are more favorable than those of the comparative example 3f with respect to the noise of the aforementioned low frequency range.

However, it is also apparent that with regard to the graphs 3-1 to 3-5, the transmission sound loss of the graph 3-1 is in the increasing tendency compared to the transmission sound loss of the graph 3-7 in a range of frequencies of 200 (Hz) to 500 (Hz), whereas the transmission sound losses of the graphs 3-2 to 3-5 are in the tendency narrowing sequentially a frequency range which is in the increasing tendency compared to the transmission sound loss of the graph 3-7.

According to the above description, in the case of an inner diameter of the opening portions being 20 (mm), in the working example, the frequency range of the sound insulation characteristics, namely, soundproofing characteristics, which are favorable compared to those of the comparative examples 2e and 2f, narrows in sequence in the predetermined low frequency range, as the opening ratio of the opening portions of the working example become larger.

In addition, with regard to noise of the predetermined high frequency range, the transmission sound loss characteristics of each of the working examples 3a to 3e are maintained between the transmission sound loss characteristics of the comparative example 3f and the transmission sound loss characteristics of the comparative example 3g.

This means that the sound insulation characteristics of the working examples 3a to 3e are maintained between the sound insulation characteristics of the comparative example 3f and the sound insulation characteristics of the comparative example 3g. Therefore, with respect to the predetermined high frequency range noise, the soundproofing characteristics of the working examples 3a to 3e are worse than those of the comparative example 3g, and are more favorable than those of the comparative example 3f.

Figure 6:
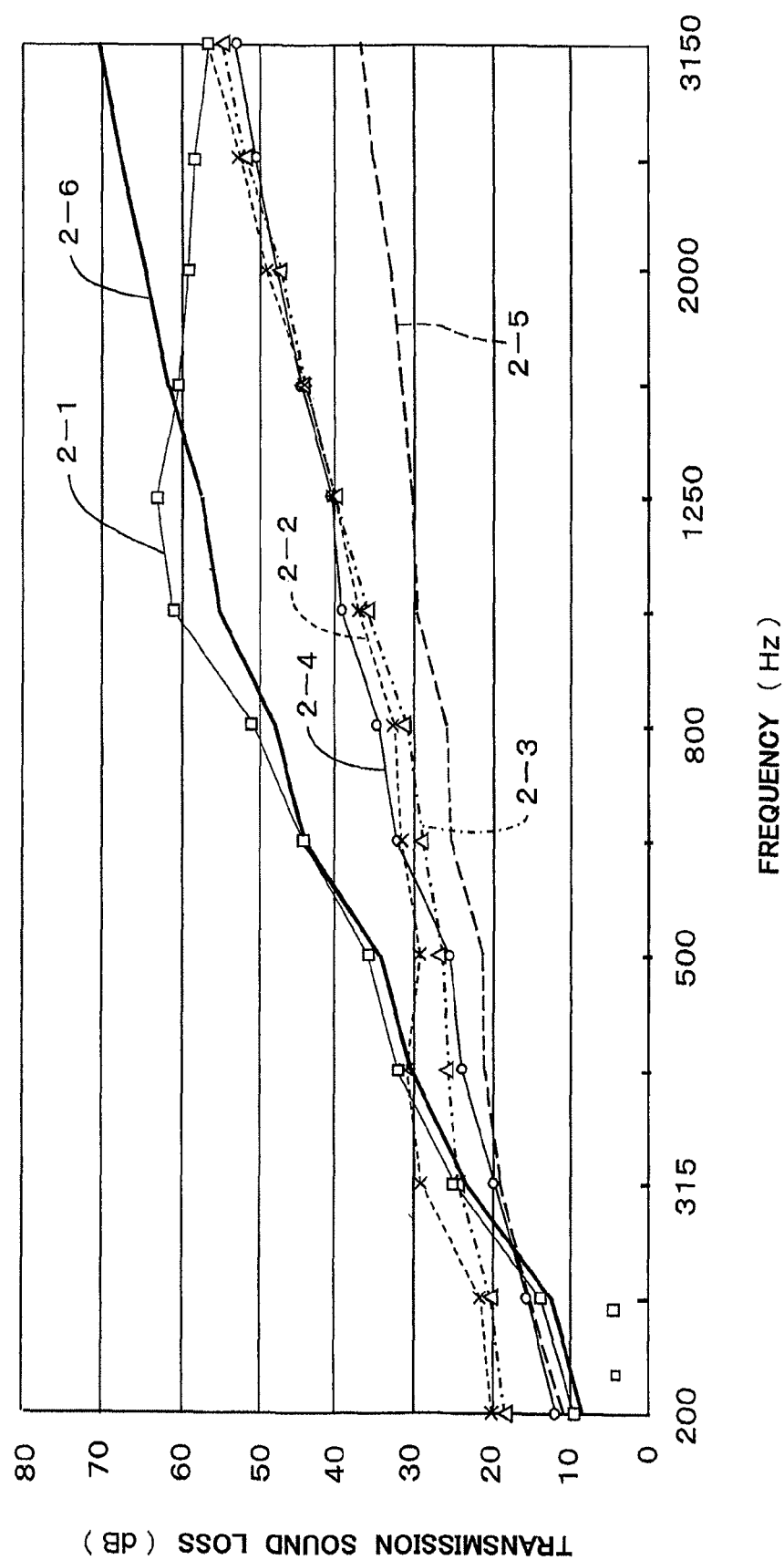
FIG. 6 shows graphs of transmission sound loss characteristics of other working examples and other comparative examples according to the first embodiment in relation to frequencies of the engine sound.
Figure 7:
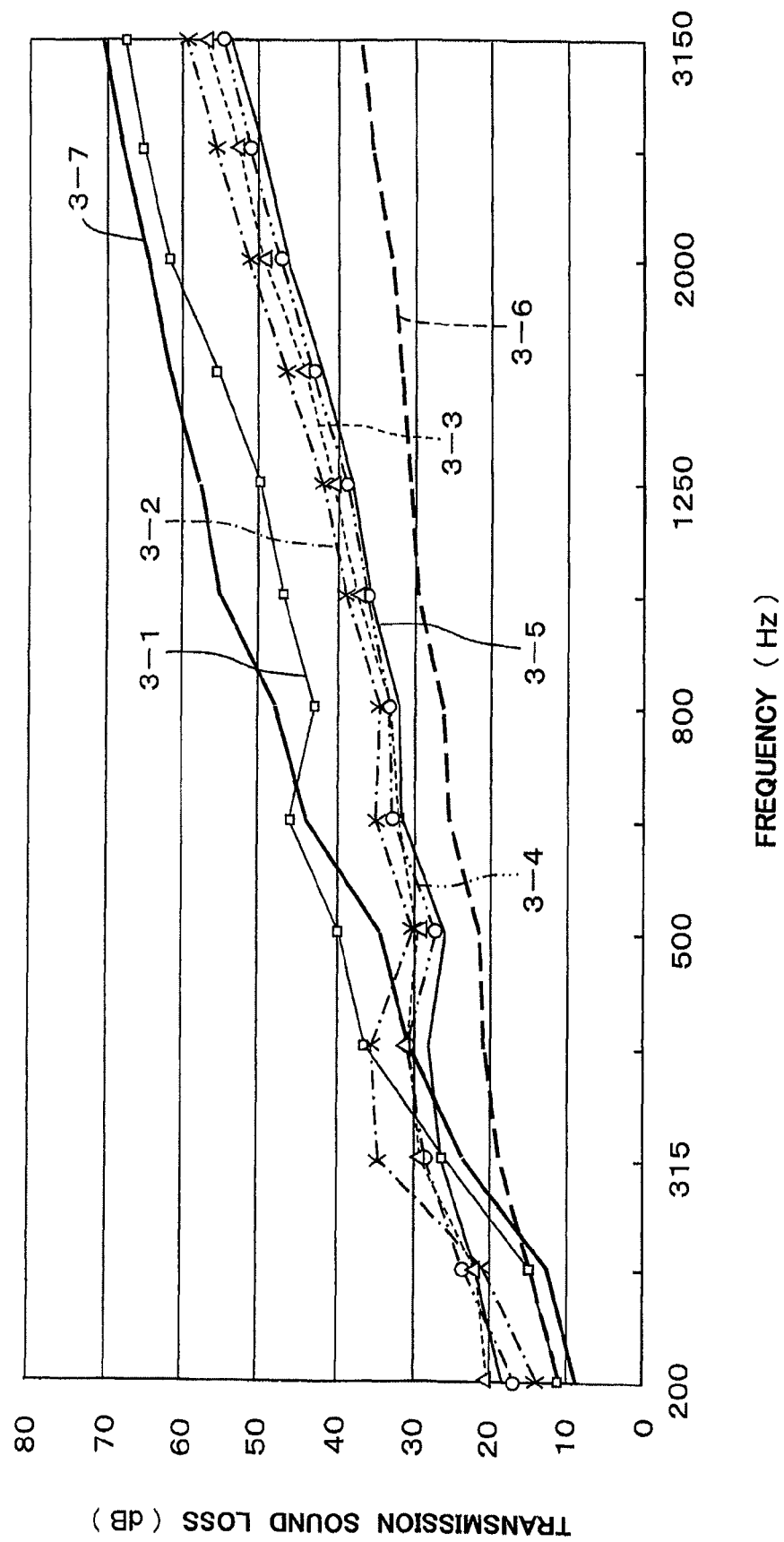
FIG. 7 shows graphs of transmission sound loss characteristics of other working examples and other comparative examples according to the first embodiment in relation to frequencies of the engine sound.

According to the results of the aforementioned measurements shown in FIGS. 6 and 7, provided that the opening ratio of the opening portions is equal to or higher than 5(%) and equal to or lower than 45(%), in a range in which the inner diameter of the opening portions is larger than 10 (mm) and equal to or smaller than 80 (mm), the soundproofing characteristics of the dash insulator of the present first embodiment can be secured more favorably than those of the comparative examples. However, a frequency range of more favorable soundproofing characteristics than those of the comparative examples narrows, as the opening ratio of the opening portions increases.

Further, the inventor of the present invention prepared, in addition to the aforementioned working examples, a large number of laminated bodies each of a sound absorption layer of a membrane-vibration type and a rear layer by changing the masses of the sound absorption layer of the membrane-vibration type and the rear layer, as well as the opening areas and the number of the opening portions of the rear layer, in various ways. Then, measurements similar to those described above have been performed with respect to these laminated bodies.

As a result, it has been found that the soundproofing effects of the dash insulator can be favorably obtained by selecting the aforementioned predetermined opening ratio range and predetermined opening number range so as to suppress the resonance phenomenon between the vibrations of the sound absorption layer of the membrane-vibration type and the rear layer under the laminated body of the sound absorption layer of the membrane-vibration type and the rear layer in relation to noise components of the predetermined low frequency range of the noise, as described above.

Figure 8:
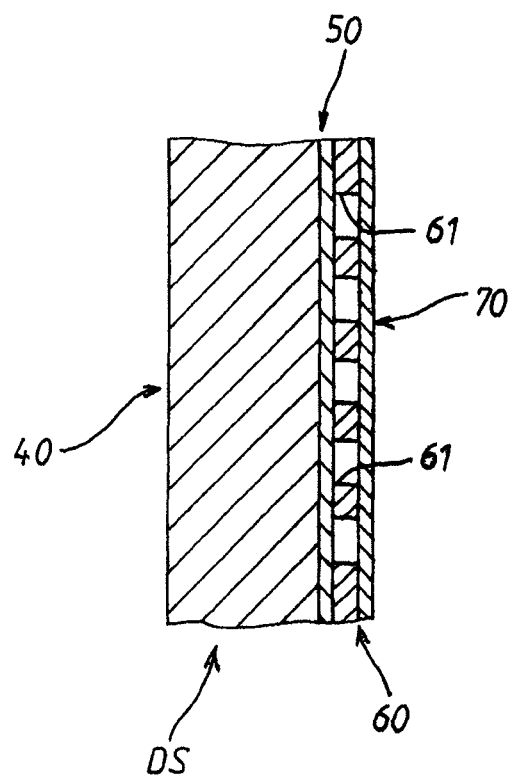
FIG. 8 is a partial enlarged longitudinal cross-sectional view showing major parts of a second embodiment of the dash insulator according to the present invention.

FIG. 8 shows a second embodiment of the present invention. In this second embodiment, a skin layer 70 is supplementarily adopted in the construction of the dash insulator DS described in the above first embodiment, in addition to the three-layer structure of the front layer 40, the intermediate layer 50 and the rear layer 60 described in the above first embodiment.

The skin layer 70 is, as shown in FIG. 8, mounted along the rear layer 60 so as to oppose the intermediate layer 50 through the rear layer 60 in the dash insulator DS described in the above first embodiment. In the present second embodiment, the skin layer 70 is formed from a porous material. Other configurations are similar to those of the above first embodiment.

In the second embodiment with the aforementioned construction, the skin layer 70 is mounted as a sound absorption layer along the rear layer 60 as described above. Herein, the skin layer 70 exerts favorable sound absorption characteristics with respect to noise components of the high frequency range of noise.

When engine sound is, therefore, incident on the dash insulator DS as noise as described in the above first embodiment, even if noise components of the high frequency range of the noise are transmitted through the rear layer 60 of the dash insulator DS, they can be favorably absorbed by the skin layer 70. This means that in the present second embodiment, the dash insulator DS can further improve the soundproofing effects against noise by adopting the skin layer 70.

Thus, it is possible to ensure more favorably soundproofing from the inside of the vehicle compartment 20 against noise components of the high frequency range out of the noise.

As a result, by the dash insulator according to the second embodiment, noise can be favorably soundproofed over a wide frequency range of a low to high frequency range with the laminated body of the intermediate layer 50 and the rear layer 60, which have construction described in the above first embodiment, under the sound absorption function based on the membrane vibration of the intermediate layer 50, the sound insulation function of the rear layer 60, and the sound absorption function of the skin layer 70 according to the second embodiment. Other operation and effect are similar to those of the above first embodiment.

In addition, for embodying the present invention, the following various modification examples are given without limitation to each embodiment as described above.

(1) For embodying the present invention, the forming material of the film layer which is the sound absorption layer 50 of the membrane-vibration type may be lightweight synthetic resin such as nylon, polypropylene and polyurethane without limitation to polyethylene resin.

(2) For embodying the present invention, the non-air permeable thin membrane layer which is the sound absorption layer 50 of the membrane-vibration type is not limited to the single film described in the above embodiments, and may be, for example, constructed by various types of thin membranes such as a lamination of two sheets or two layers of films, a lamination of three sheets or three layers of films and so on.

Herein, the sound absorption layer 50 of the membrane-vibration type is not limited to the non-air permeable thin membrane layer of a flexible material such as film or the like, and may be an air permeable thin membrane layer of a flexible material such as film or the like.

It is possible to achieve the same operation and effect as those described in the above embodiments with a laminated structure of the air permeable thin membrane layer and the rear layer 60.

(3) The forming material of the front layer 40 is not limited to the material described in the above embodiments, and may be organic fibers such as PET, wool or the like a structural material of inorganic fibers such as glass wool or the like or a porous synthetic resin material such as a polyurethane foam or the like, or a sound insulation material such as olefin-based resin, EVA resin, PVC resin or the like.

(4) Noise against the dash insulator DS is not limited to engine sound, and may include various types of noise which enters the inside of the vehicle compartment.

(5) For embodying the present invention, the present invention is not limited to being applied to the dash insulator, and may be applied to a floor insulator, a pillar insulator, a roof insulator, a room partition insulator, a hood insulator, an engine under cover insulator, a floor carpet or the like of the motor vehicle.

(6) For embodying the present invention, the present invention is not limited to being applied to the dash insulator for the motor vehicle, and may be applied to, for example, a soundproof body such as a soundproofing wall of a building.

(7) For embodying the present invention, the predetermined opening ratio range and the predetermined opening number range described in the above embodiments may be set so as to substantially enable suppression of the resonance phenomenon with a sum of the noise reduction effects based on only an adjustment of the mass of the sound absorption layer of the membrane-vibration type and the noise reduction effects based only on an adjustment of the mass of the rear layer, the opening surface and the number of the opening portions of the rear layer, differing from the above embodiments.

(8) For embodying the present invention, an opening shape of each opening portions of the rear layer are not limited to a circular shape, and may be any shape such as a rhomboidal shape, a triangular shape, a quadrilateral shape, a long elliptic shape, and other elliptic shapes.

(9) For embodying the present invention, the soundproofing effects of the dash insulator against noise can be ensured substantially favorably in relation to noise components of the low frequency range of the noise, as long as the intermediate layer can suppress the resonance phenomenon between the vibrations of the intermediate layer and the rear layer under the laminated body of the intermediate layer and the rear layer in relation to noise components of the low frequency range of the noise.

(10) For embodying the present invention, it is possible to maintain the vibration of the laminated structure so as to suppress the resonance phenomenon between the vibrations of the sound absorption layer 50 and the rear layer 60 in relation to noise components of the low frequency range of noise, if the rear layer 60 provided with the plurality of opening portions 61 is layered on the sound absorption layer 50 without setting the opening ratio and the number of the opening portions 61 of the rear layer 60 as described in the above embodiments. This can also obtain the soundproofing effects ensuring the sound absorption function based on the membrane vibration of the sound absorption layer 50 and the sound insulation function of the rear layer 60.

What is claimed is:

1. A soundproof body comprising:
   one side layer formed from a porous material;
   another side layer; and
   an intermediate layer interposed between said one side layer and said other side layer;
   wherein said intermediate layer is formed from a sound absorption layer of a membrane-vibration type which is formed from a non-air permeable thin membrane layer of a flexible material, and
   said other side layer is formed from a perforated sound insulation layer which is formed from a sound insulation material so as to include a plurality of opening portions in a dispersed manner, and
   wherein an opening ratio and an opening number of the plurality of the opening portions of said perforated sound insulation layer are set respectively in a predetermined opening ratio range and a predetermined opening number range under mass of a laminated body of said non-air permeable thin membrane layer and said perforated sound insulation layer so as to maintain a vibration of said laminated body in relation to noise components of a predetermined low frequency range of noise in a predetermined phase difference range which is predetermined to suppress a resonance phenomenon of said laminated body occurring based on the noise components of the predetermined low frequency range of the noise.

2. A soundproof body comprising:
   one side layer formed from a porous material;
   another side layer; and
   an intermediate layer interposed between said one side layer and said other side layer,
   wherein said intermediate layer is formed from a sound absorption layer of a membrane-vibration type which is formed from an air permeable thin membrane layer of a flexible material, and
   said other side layer is formed from a perforated sound insulation layer which is formed from a sound insulation material so as to include dispersedly a plurality of opening portions, and
   wherein an opening ratio and an opening number of the plurality of the opening portions of said perforated sound insulation layer are set respectively in a predetermined opening ratio range and a predetermined opening number range under mass of a laminated body of said air permeable thin membrane layer and said perforated, sound insulation layer so as to maintain a vibration of said laminated body in relation to noise components of a predetermined low frequency range of noise in a predetermined phase difference range which is predetermined to suppress a resonance phenomenon of said laminated body occurring based on the noise components of the predetermined low frequency range of noise.

3. The soundproof body according to claim 1, further comprising a skin layer which is formed from a porous material and layered on said perforated sound insulation layer so as to oppose said sound absorption layer of the membrane-vibration type through said perforated sound insulation layer.

4. An insulator mounted on a part of a body of a motor vehicle, the insulator comprising a soundproof body including:
   one side layer formed from a porous material and mounted on the part of the body;
   another side layer
   an intermediate layer between said one side layer and said other side layer,
   wherein in said soundproof body, said intermediate layer is formed from a sound absorption layer of a membrane-vibration type which is formed from a non-permeable thin-membrane layer of a flexible material or an air-permeable thin membrane layer of a flexible material, and
   said other side layer is formed from a perforated sound insulation layer of a sound insulation material so as to include dispersedly a plurality of opening portions, and
   wherein an opening ratio and an opening number of the plurality of the opening portions of said perforated sound insulation layer are set respectively in a predetermined opening ratio range under mass of a laminated body of said sound absorption layer of the membrane-vibration type and said perforated sound insulation layer so as to maintain a vibration of said laminated body in relation to noise components of a predetermined low frequency range of the noise in a predetermined phase difference range which is predetermined to suppress a resonance phenomenon of said laminated body occurring based on the noise components of the predetermined low frequency range of the noise.

5. The insulator for the motor vehicle according to claim 4, wherein said soundproof body further includes a skin layer which is formed from a porous material and which is layered on said other side layer so as to oppose said intermediate layer through said other side layer.

6. An insulator for a motor vehicle, used as a dash insulator and mounted on a part of a body of the motor vehicle, the insulator comprising a soundproof body which includes:
   one side layer which is formed from a porous material, said one side layer being mounted from an inside of the vehicle compartment on a dash panel which separates an engine room and a vehicle compartment of the body;
   another side layer;
   an intermediate layer between said one side layer and said other side layer,
   wherein in said soundproof body, said intermediate layer is formed from a sound absorption layer of a membrane-vibration type which is formed from a non-air permeable thin membrane layer of a flexible material or an air permeable thin membrane layer of a flexible material, and
   said other side layer is formed from a perforated sound insulation layer of a sound insulation material so as to include dispersedly a plurality of opening portions, and
   wherein an opening ratio and an opening number of the plurality of the opening portions of said perforated sound insulation layer are set respectively in a predetermined opening ratio range and a predetermined opening number range under mass of a laminated body of said sound absorption layer of the membrane-vibration type and said perforated sound insulation layer so as to maintain a vibration of said laminated body in relation to noise components of a predetermined low frequency range of noise in a predetermined phase difference range which is predetermined to suppress a resonance phenomenon of said laminated body occurring based on the noise components of the predetermined low frequency range of the noise.

7. The insulator for the motor vehicle according to claim 6 used as the dash insulator, wherein said soundproof body further includes a skin layer which is formed from a porous material and which is layered on said other side layer so as to oppose said intermediate layer through said other side layer.

8. The soundproof body according to claim 2, further comprising a skin layer which is formed from a porous material and layered on said perforated sound insulation layer so as to oppose said sound absorption layer of the membrane-vibration type through said perforated sound insulation layer.

\* \* \* \* \*